United States Patent

[11] 3,621,408

[72] Inventor Paul G. Kennedy
Monroeville, Pa.
[21] Appl. No. 873,569
[22] Filed Nov. 3, 1969
[45] Patented Nov. 16, 1971
[73] Assignee Westinghouse Electric Corporation
Pittsburgh, Pa.

[54] FM DEMODULATOR
9 Claims, 4 Drawing Figs.

[52] U.S. Cl. .......... 329/103, 307/233, 307/271, 328/109, 329/126
[51] Int. Cl. .......... H03d 3/14
[50] Field of Search .......... 329/102, 103, 107, 126, 148; 328/109; 307/233, 271

[56] References Cited

UNITED STATES PATENTS

| | | | |
|---|---|---|---|
| 3,231,824 | 1/1966 | Drapkin | 329/126 X |
| 3,244,991 | 4/1966 | Hofmann | 329/145 X |
| 3,252,100 | 5/1966 | Webb | 307/271 |
| 3,296,539 | 1/1967 | Felix | 329/126 X |
| 3,328,710 | 6/1967 | Baldwin | 329/103 |
| 3,386,041 | 5/1968 | Bell | 329/102 |

*Primary Examiner*—Alfred L. Brody
*Attorneys*—F. H. Henson, C. F. Renz and A. S. Oddi

ABSTRACT: A frequency demodulator for demodulating FM signals in direct and complementary form wherein a pair of switching devices, such as transistors ro similar devices are switched to opposite conductivity states in response to the FM signals and wherein a delay line is connected between output terminals of the devices so that when one of the devices is switched to its nonconductive state a voltage is propagated from the output terminal through the delay line and reflected out of phase by the substantially zero impedance of the conductive device back through the delay line, so that, after a time delay of substantially twice the delay of the delay line, the voltage at the output terminal of the nonconductive device is substantially zero. The output voltage generated at the output electrode of each of the devices is thus a series of pulses at the frequency of the FM signals and having a constant pulse width of substantially twice the time delay of the delay line.

WITNESSES
Alfred G. Colaizzi
James F. Young

INVENTOR
Paul G. Kennedy
ATTORNEY

FM DEMODULATOR

BACKGROUND OF THE INVENTION

1. Field of the Invention

The present invention relates to frequency demodulators and, more particularly, to frequency demodulators of the zero crossing detection, substantially constant pulse width generating type.

2. Discussion of the Prior Art

A common technique for demodulating frequency modulated signals where a carrier frequency is modulated according to frequency with video information, which is for example recorded on a magnetic recording media, such as, a video tape recorder or a magnetic recording disc, is to generate a substantially constant pulse width signal each time the frequency modulated signal crosses the zero voltage axis. the series of substantially constant pulse width pulses are then passed through a low pass filter which provides an output corresponding to the original video intelligence. A serious disadvantage of presently used systems of the described type is that the pulses generated when the FM modulated waveform changes polarity from positive to negative may not have exactly the same pulse width as those generated when the FM waveform goes from a negative to a positive polarity. The difference in pulse width generated in response to the opposite polarity changes is typically due to the difference in turn on and turn off times of the semiconductor switching devices, such as transistors, used in the demodulating circuitry or may be due to the use of different devices for generating the output pulses for the opposite polarities. If pulses of different widths are generated for the different polarities of the FM signals, this is readily apparent to a viewer of the reproduced video information derived therefrom. The problem introduced by the generation of pulses having different pulse widths is termed in the art as "carrier breakthrough," wherein the error signal produced due to the difference in pulse widths when pulses are averaged in the low pass filter occur at carrier frequency equal to the original FM carrier. When carrier breakthrough occurs the reproduction of the original video information is seriously affected. In the demodulator system of the present invention the problem of carrier breakthrough is solved by providing exactly equal pulse width pulses for both positive and negative polarities of the FM signal. Moreover, a highly economical design is provided utilizing relatively few and inexpensive components within the demodulator circuitry.

SUMMARY OF THE INVENTION

Broadly, the present invention provides a frequency demodulator for demodulating FM signals wherein pulses are generated in response to the same change of conductive state of the switching devices utilized independently of the direction of change of polarity, wherein a single delay line causes the pulse width of each of the pulses to be identically determined.

DESCRIPTION OF THE PREFERRED EMBODIMENTS

Figure 1:
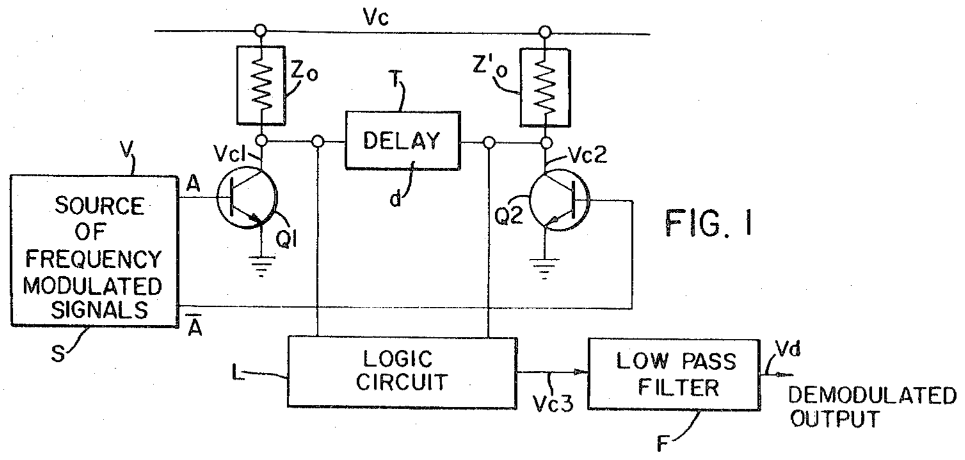
FIG. 1 is a schematic-block diagram of a basic embodiment of the present invention.

Referring to FIG. 1, the frequency demodulator of the present invention is shown for demodulating frequency modulated signals from a source of frequency modulated FM signals S. The source of FM signals S may comprise a magnetic recording media, such as, a video tape recorder or magnetic recording disc, wherein the frequency modulated signals are recorded which are derived from frequency modulating a carrier frequency with video or other information. the magnetically recorded FM signals would be transduced into electrical signals through a playback head to provide FM signals in electrical form. The electrical FM signals are suitably amplified and processed to provide constant amplitude output signal whose frequency varies according to the video intelligence modulated thereon. The source of FM signals S is shown to have a direct output A and the complementary output $\overline{A}$ thereof. The direct output A and the complementary output $\overline{A}$ may be provided by well-known techniques such as phase splitting.

Figure 2:
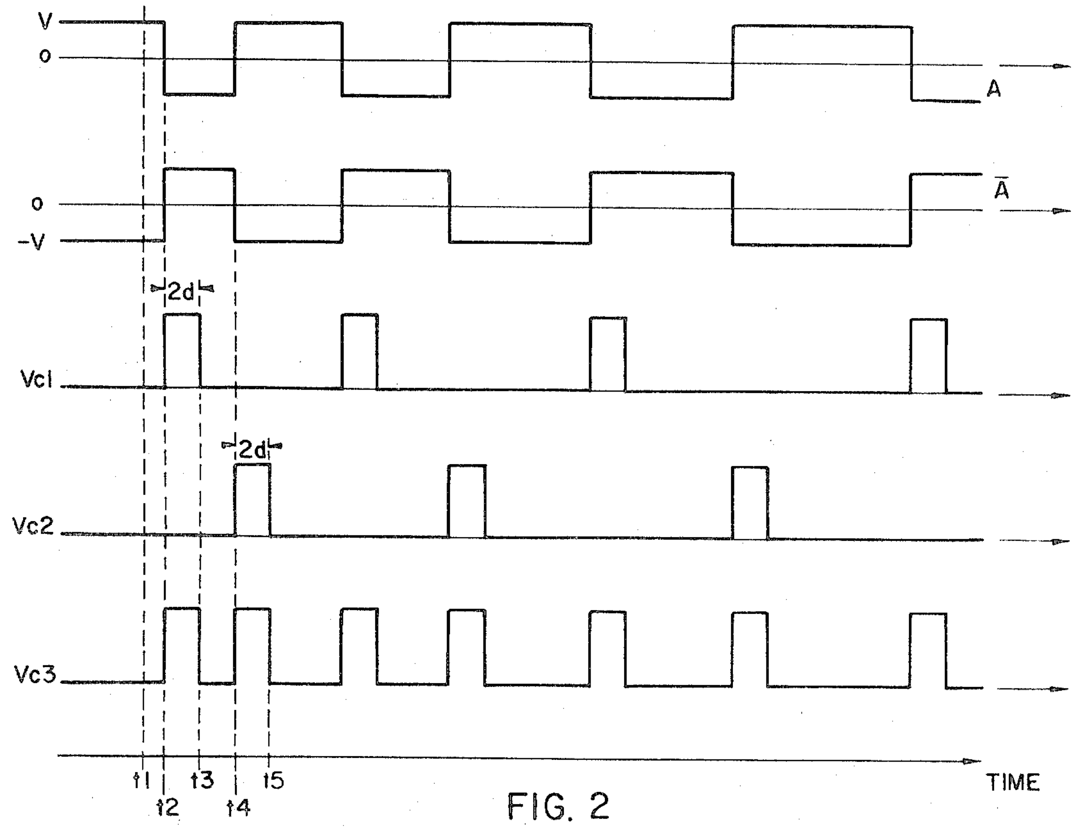
FIG. 2 is a waveform diagram including a series of curves used in explaining the operation of the various embodiments herein.

In FIG. 2 curves A and $\overline{A}$ show the corresponding A and $\overline{A}$ outputs of the source S. The curves $Vc1$, $Vc2$, and $Vc3$, of FIG. 2 respectively show the waveforms appearing at the identically indicated circuit points of FIGS. 1, 3 and 4. The curves A and $\overline{A}$ of FIG. 2 are complements of one another. That is, when the output A is at a positive voltage +V the complementary output $\overline{A}$ is at a negative voltage −V. Accordingly, when the output A changes polarity causing the zero axis to go to a negative voltage, the complementary output $\overline{A}$ goes to a positive polarity.

The direct output A of a source S is applied to the base of a first transistor Q1, and the complementary output $\overline{A}$ is applied to the base of a second transistor Q2. Both of the transistors Q1 and Q2 are shown to be of the NPN-type and each have its emitter electrode connected to a ground reference potential. Connected between the collector electrodes of the transistors Q1 and Q2 is a delay line T which has a delay time *d* for the propagation of a signal from one end to the other. The delay line T is selected to have the desired delay time *d* and is also selected to have a relatively low resistance across the output terminals thereof. An impedance $Z_0$ is connected between a source of positive operating potential $Vc$ (not shown) and the collector electrode of the transistor Q1 where one end of the delay line T is connected. A similar impedance $Z'_0$ is connected between the $Vc$ source and the collector of the transistor Q2 to which the other end of the delay line T is connected. The impedances Z0 and Z'0 are selected to be substantially identical and to have an impedance value matched to the characteristic impedance of the delay line T. The impedances Z0 and Z'0 may comprise a purely resistive element or complex impedances having reactive components suitably matching the characteristic impedance of the delay line T.

As shown in the curves of FIG. 2 at a time *t*1, with positive base voltage being applied to the transistor Q1, the collector voltage $Vc1$ is at ground or substantially zero voltage as shown in curve $Vc1$. The transistor Q2 is in a nonconductive state at the time *t*1 being biased off by the negative base voltage $\overline{A}$ applied thereto. However, the collector voltage $Vc2$ of the transistor Q2 is also at zero potential since it is connected to the collector of the transistor Q1 through the delay line T which is selected to have a negligible resistance. Curve $Vc2$ of FIG. 2 shows the collector voltage $Vc2$.

At a time t2 the FM output A, $\overline{A}$ changes phase so that the transistor Q2 is rendered conductive by the application of the positive voltage to the base thereof. The collector voltage $Vc2$, does not change since it was already at zero potential. With the transistor Q1 turning off the collector voltage $Vc1$ thereof will rise toward the operating voltage $Vc$. The wave front of the collector voltage $Vc1$ propagates through the delay line T being delayed by a line *d* from the time the waveform appears at the collector of the transistor Q1 until it reaches the collector of the transistor Q2 which is at ground potential. Since the transistor Q2 is in a conductive state, the dealy line T is terminated by a substantially zero impedance which causes the wave front to be reflected back, 180° out of phase with respect to the original wave front, through the delay line T to the collector of the transistor Q1 after a further time delay *d*. The inverted wave front reaches the collector of the transistor Q1 at a time *t*3 which is a period of time equal to twice the delay time *d* of the delay line T. Thus at the time *t*3 a zero voltage appears at the collector of the transistor Q1 without any reflection occurring since the impedance $Z_0$ is selected to be at the characteristic impedance of the delay line T and the wave front is absorbed thereby. The collector voltage *Vc*1 then remains at zero voltage being connected via the negligible resistance of the delay line T to the collector of the conductive transistor Q2.

It should be noted from curve *Vc*1 of FIG. 2 that during the time *t*2 to *t*3, a voltage pulse having a time duration equal to twice the delay time *d* appears at the collector of the transistor Q1 and is applied to a logic circuit l. The logic circuit L may, for example, comprise a summing circuit or an OR logic circuit so that in response to the pulse input during the time *t*2 to *t*3 it will provide an output pulse *Vc*3 as shown in curve *Vc*3 of FIG. 2.

At a time t4 the A and $\bar{A}$ outputs reverse phase so that the transistor Q1 is turned on and the transistor Q2 is turned off. With the turning on of the transistor Q1, the collector voltage already being at ground potential does not change. However, the collector voltage *Vc*2 the transistor Q2 rises with the turning off of the transistor Q2 to the operating voltage *Vc* with a wave front appearing at the collector thereof at the time *t*4. This wave front is propagated from the collector of the transistor Q2 through the delay line T and after a time delay of *d* reaches the substantially zero impedance termination of the conductive transistor Q1. The wave front is then inverted 180° and reflected back through the delay T with another time delay *d* occurring before the inverted wave front reaches the collector of the transistor Q2. Thus a zero potential appears at the collector thereof after a time delay of 2*d* at a time *t*5. the waveform is not reflected at the Q2 end since it is adsorbed by the characteristic impedance termination of the impedance Z'0. As shown in curve *Vc*2 of FIG. 2 the voltage at the collector of the transistor Q2 during the times *t*4 to *t*5 is a pulse waveform having a pulse width 2*d*. This voltage pulse is applied to the logic circuit L and is outputted thereby as a voltage pulse *Vc*3 as shown in curve *Vc*3 of FIG. 2.

The operation of the demodulator continues as described with a voltage pulse being generated at the collector of the transistor Q1 each time that the transistor T1 is rendered nonconductive in response to the base voltage A thereto going negative. The pulse generated is of constant width pulse having a pulse width of twice the delay time (2*d*) as shown in curve *Vc*1. Correspondingly, each time that the transistor Q2 is turned off a pulse voltage *Vc*2 having a constant pulse width 2*d* is also generated.

The composite output of the logic circuit L comprises the individual 2*d* pulse width pulses from the collectors of the transistors Q1 and Q2 as shown in curves *Vc*1 and *Vc*2, respectively. The composite output *Vc*3 thus comprises a series of pulses having a constant pulse width 2*d*, however, being spaced in accordance with the crossovers of the original FM signals A and $\bar{A}$. Thus at higher frequencies the pulses are spaced relatively close together while at lower frequencies the pulses are spaced farther apart as shown respectively on the left and right sides of curve *Vc*3.

the composite output *Vc*3 is applied to a low pass filter F which has a pass band corresponding to the frequency spectrum of the original video or other intelligence which was modulated on the FM carrier. The low pass filter F averages the pulse waveform of curve *Vc*3 to provide a demodulated output as shown in curve *Vd* of FIG. 2 corresponding to the original video or other intelligence. Accordingly, the demodulator output *Vd* is the average or DC level of the waveform *Vc*3 so that for closely spaced pulses indicative of a higher frequency a higher value of voltage is provided than for the more widely spaced pulses indicative of lower frequency. In a typical implementation the highest frequency would be indicative of a pure white video scene, and the lowest frequency would be indicative of a blacker than black level, for example. The demodulated output *Vd* may be suitably amplified, processed and, displayed on a standard cathode ray tube monitor or television receiver.

Figure 3:
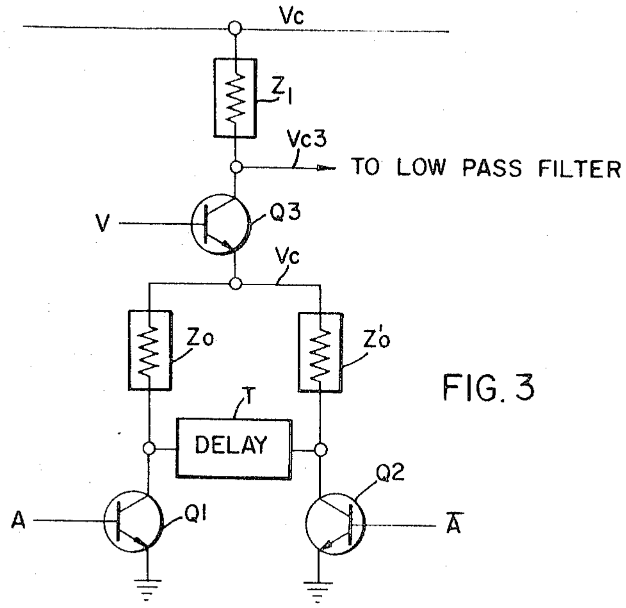
FIG. 3 is a schematic diagram of an embodiment of the present invention.

FIG. 3 shows a particular implementation of the logic circuit L wherein a transistor Q3 is utilized. The transistor Q3 is connected with its emitter electrode to the top junction of the characteristic impedances Z0 and Z'0 and its collector connected through an impedance Z1 to the operating source line *Vc*. A positive voltage V is applied to the base of the transistor Q3 to maintain it in a conductive state with the output of *Vc*3 being taken from the collector thereof and applied to the low pass filter F. In the period between the generation of the constant width pulses, such as at the time *t*1 in FIG. 2, the emitter current from the emitter electrode of transistor Q3 will pass through the conductive transistor (Q1) via two paths, one being the characteristic impedance Z0 and the other being the characteristic impedance Z'0 and the delay line T. Since the resistance of the delay line T is negligible compared to the other impedances, current through the conductive transistor Q1 at the time *t*1 will be:

$$I=2Ve/Zo,$$

where *Ve* is the emitter voltage of the transistor Q3 with respect to ground and *ZO=Z'O*. At the time *t*2 when the transistor Q1 is turned off the current flow through impedance Zo and the collector-emitter circuit of the transistor Q1 is terminated with the rise of the collector voltage at the collector of the transistor Q1. No current flows through the impedance ZO and the transistor Q1 during the time period 2*d* when the wave front of the collector voltage of the transistor Q1 is propagated through the delay line T to the collector of the transistor Q2 and back again. At the time *t*3 when the voltage at the collector Q1 becomes zero, current again flows through the impedance ZO from the emitter electroce of the transistor Q3 and through the delay line T to the collector-emitter circuit of the transistor Q2. During the time period that the pulse appears at the collector of the transistor Q1, the emitter current of the transistor Q3 is then:

$$I=Ve/Zo.$$

In other words, the current through the transistor Q3 during the generation of the constant pulse width pulses at the collector of the transistor Q1 and Q2, respectively, is one half the value of current flowing therethrough when pulses are not being generated. Accordingly, the voltage drop across the load impedance A1 for the transistor Q3 is substantially one half the value when pulses are being generated as compared to when pulses are not being generated. Thus the output voltage *Vc*3 at the collector of Q3 has a waveform substantially as shown in curve *Vc*3 of FIG. 2 wherein the magnitude of pulses will be equal to:

$$(Z1/Z0)Ve,$$

and having a constant pulse width of 2*d*. The load impedance Z1 of the transistor Q3 is selected to be the characteristic impedance to match the input impedance of the low pass filter F, and affords efficient transfer of the pulses *Vc*3 to the low pass filter F.

Figure 4:
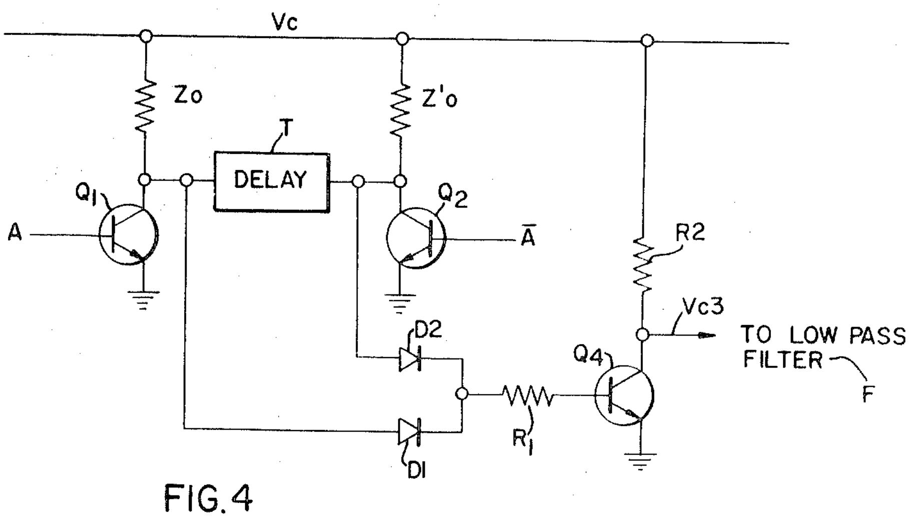
FIG. 4 is a schematic diagram of another embodiment of the present invention.

FIG. 4 shows another embodiment wherein the voltage pulses occurring at the collector of the transistors Q1 and Q2 are gated to the output directly preventing any mismatch of current amplitude that might occur such as in the circuit of FIG. 3 due to the mismatch between the components ZO and Z'O. In FIG. 4 the collector of the transistor Q1 is connected to the anode of a diode D1 and the collector of the transistor Q2 is connected to the anode of a diode D2 with the cathode electrodes of diodes D1 and D2 being commonly connected. A resistor R1 is connected between the common connection of the cathodes of the diodes D1 and D2 and the base electrode of a transistor Q4. The operating voltage Vc is supplied to the transistor Q4 via a resistor R2 connected between the Vc line and the collector thereof with the emitter of the transistor Q4 being connected to the ground. The collector of the transistor Q4 supplies the output Vc3 to the low pass filter F.

The diodes D1 and D2 are utilized to prevent a parallel path around the delay line T and also to insure that the transistor Q4 is switched on at a desired pulse amplitude. The resistor R1 is selected to have such a value so that when the transistor Q4 is turned on the conductive transistor (Q1 or Q2) is not excessively loaded. Moreover, the resistor R1 is selected to have a high value as compared to the characteristic impedances $Z_0$ and $Z'_0$ so as not appreciably to affect the characteristic impedance termination for the delay line T provided by the impedances $Z_0$ and $Z'_0$.

Accordingly, when the transistor Q1 is turned off such, as at the time $t2$, and a voltage pulse $Vc1$ is generated at the collector thereof, this pulse is applied through the diode D1 and the resistor R1 to the base emitter circuit of the transistor Q4 thereby turning on this transistor and providing an output pulse $Vc3$ in response thereto. Transistor Q4 is normally nonconductive between the generation of a constant pulse width pulses in that a substantially zero potential is provided to the base thereof during these times. Transistor Q4 continues to conduct for the time period $2d$ until the collector of the transistor Q1 reaches a zero potential. Transistor Q4 then remains nonconductive until a pulse is generated at the collector of the transistor Q2. The transistor Q4 is then activated via diode D2 and resistor R1 to be turned on for a time duration $2d$ with an output pulse $Vc3$ being generated thereby. Thus a series of constant pulse width pulses are generated at the collector of the transistor Q4 such as shown in curve $Vc3$ of FIG. 3 where the pulses have a constant pulse width and whose repetition rate is dependent upon the frequency of the input FM signals A and A as shown in curves A and $\bar{A}$ of FIG. 2.

The demodulator circuit as described in reference to FIGS. 1, 3 and 4 above have a high degree of linearity. An input FM frequency up to a theoretical maximum of $1/4d$ which is determined by the time required for pulse to be propagated through the delay line T and back before a second pulse can be generated. Due to practical bandwidth limitations however, the linear range has been found to be a maximum frequency of approximately 0.8 of the theoretical limit.

Although the present invention has been described with certain degree of particularity, it is to be understood that the present disclosure has been made only by way of example and that numerous changes in the details of circuitry and the combination arrangement of parts, elements and components can be resorted to without departing from the spirit and scope of the present invention.

I claim as my invention:

1. A frequency demodulator for demodulating FM signals in direct and complementary form and operative with a source of operating potential comprising:
first and second switching devices each including input and first and second output terminals;
means for applying said operating potential to each of said first output terminals,
delay means having a predetermined time delay operatively connected between the respective first output terminals of said devices,
said second output terminals being connected to a reference potential;
means for applying said FM signals in direct form to said input terminal of said first device and in complementary form to said input terminal of said second device for switching one of said devices to a conductive state so that said first output terminal is substantially at said reference potential and the other device in a nonconductive state, so that when one of said devices is switched to its nonconductive state, the voltage appearing at its first output terminal being propagated through said delay means and reflected by the conductive device back through said delay means so that after a time delay of substantially twice said predetermined time delay the voltage at said first output terminal of the nonconductive device is substantially at said reference potential; and
output means responsive to the voltages appearing at said first output terminals of said devices for providing output pulses which comprise voltage pulses generated when the polarity of said FM signals changes and having a pulse width substantially equal to twice said predetermined time delay.

2. The demodulator of claim 1 wherein:
the conductive device presents a substantially zero impedance to the voltage applied thereto from said delay means so that this voltage is reflected back in an inverted phase with respect to its propagated phase.

3. The demodulator of claim 2 wherein:
said first and second switching devices each comprise a transistor device and said input and first and second output terminals comprise respectively base, collector and emitter electrodes.

4. The demodulator of claim 2 includes:
first and second termination impedance means each having substantially the same characteristic impedance as said delay means and being operatively connected respectively to the opposite ends of said delay means so that it is terminated in its characteristic impedance at the end adjacent the nonconductive device so that the reflected voltage is not reflected thereby.

5. The demodulator of claim 2 wherein:
said output means includes a logic circuit for receiving the voltages from said first output terminals and provides said output pulses in response respectively thereto.

6. The demodulator of claim 4 wherein:
said output means includes a third device which is normally conductive and includes an output terminal operatively connected to said first and second impedance means and operative to supply current through both of said impedance means when said first output terminals are both at said reference potential and to supply current through one of said impedance means when voltage is being generated at one of said first terminals so that said output pulses are generated from the output terminal of said third device.

7. The demodulator of claim 1 includes:
filter means for receiving said output pulses and providing the average value thereof indicative of the original intelligence included in said FM signals.

8. The demodulator of claim 6 includes:
filter means for receiving said output pulses and providing the average value thereof indicative of the original intelligence included in said FM signals, and
load impedance means for said third device having an impedance matched to the characteristic impedance of said filter means.

9. The demodulator of claim 5 wherein:
said logic circuit includes a third device having input and output terminals and means for supplying the voltages from said first output terminals of said first and second devices respectively to the input terminal thereof and generating said output pulses at the output terminal thereof in response thereto.

* * * * *